United States Patent
J S

(10) Patent No.: US 11,412,007 B2
(45) Date of Patent: Aug. 9, 2022

(54) LAWFULLY INTERCEPTING TRAFFIC AND PROVIDING THE TRAFFIC TO A CONTENT DESTINATION BASED ON CHAINED TRAFFIC TAPPING

(71) Applicant: Juniper Networks, Inc., Sunnyvale, CA (US)

(72) Inventor: Sheeja J S, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 206 days.

(21) Appl. No.: 16/819,996

(22) Filed: Mar. 16, 2020

(65) Prior Publication Data
US 2021/0289004 A1 Sep. 16, 2021

(51) Int. Cl.
*H04L 29/06* (2006.01)
*H04L 9/40* (2022.01)
*G06F 8/61* (2018.01)

(52) U.S. Cl.
CPC .............. *H04L 63/306* (2013.01); *G06F 8/61* (2013.01)

(58) Field of Classification Search
CPC ... H04L 63/306; H04L 63/08; H04L 63/0263; H04L 63/04; H04L 63/0428; H04L 63/0281; H04L 63/029; H04L 63/0485; G06F 8/61
See application file for complete search history.

(56) References Cited

U.S. PATENT DOCUMENTS

| | | | | |
|---|---|---|---|---|
| 6,438,695 B1* | 8/2002 | Maufer | ............... | H04L 63/0272 379/35 |
| 7,587,591 B2* | 9/2009 | Lebovitz | ............... | H04L 12/185 370/366 |
| 8,213,768 B2* | 7/2012 | Morioka | ............ | H04N 21/6437 386/252 |
| 8,537,676 B1* | 9/2013 | Apte | ....................... | H04L 69/16 370/232 |
| 9,531,627 B1* | 12/2016 | Alvarez | ................ | H04L 45/507 |
| 9,591,031 B2* | 3/2017 | Cartmell | ............. | H04L 63/0227 |

(Continued)

OTHER PUBLICATIONS

Digital Video Broadcasting (DVB) Organization., "PKT-SP-ES-INF-C01-140314.pdf", Packet CableTM, Mar. 14, 2014, 63 pages, Switzerland, XP017848280.

(Continued)

*Primary Examiner* — Hosuk Song
(74) *Attorney, Agent, or Firm* — Harrity & Harrity, LLP

(57) ABSTRACT

A network device may receive a request, to install a filter, that includes information identifying a first source address, a first destination address, a content destination device, and a tapping level indicator. The network device may create an additional filter, based on the tapping level indicator, by setting the first destination address as a second source address, determining a third destination address that is a destination for the second source address, and setting the third destination address as a third source address. The network device may add the filter and the additional filter to a list of filters, and may receive, from source devices, packets destined for destination devices. The network device may generate a copy of a packet, and may determine that the copy of the packet matches the filter or the additional filter. The network device may forward the copy of the packet to the content destination device.

20 Claims, 13 Drawing Sheets

(56) References Cited

U.S. PATENT DOCUMENTS 9,875,344 B1 * 1/2018 Hughes .................. G06F 21/12
10,778,501 B2 * 9/2020 Rao ........................ H04L 47/24

OTHER PUBLICATIONS

European Telecommunications Standards Institute (ETSI), "Lawful Interception (LI); Interception domain Architecture for IP networks", Draft, 12LITD017R1 D/TR LI-00025, V0.1.3, May 11, 2006, 52 pages, XP014073788.
Extended European Search Report for Application No. EP20174136.0, dated Oct. 13, 2020, 8 pages.
Smith S.P., et al., "Independent Technical Review of the Carnivore System", Final Report, Dec. 8, 2000, pp. 1-113, XP002172826.

* cited by examiner

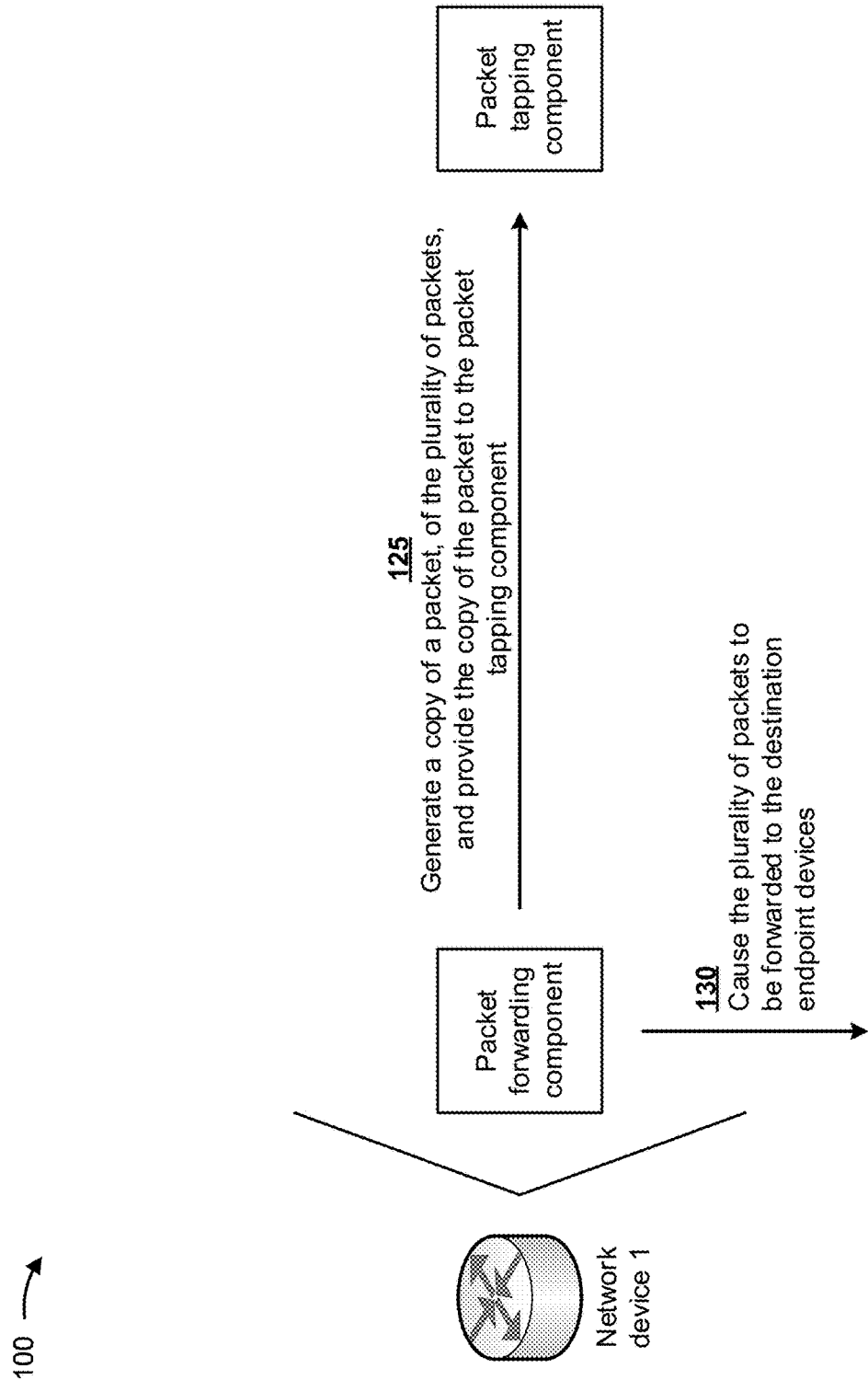

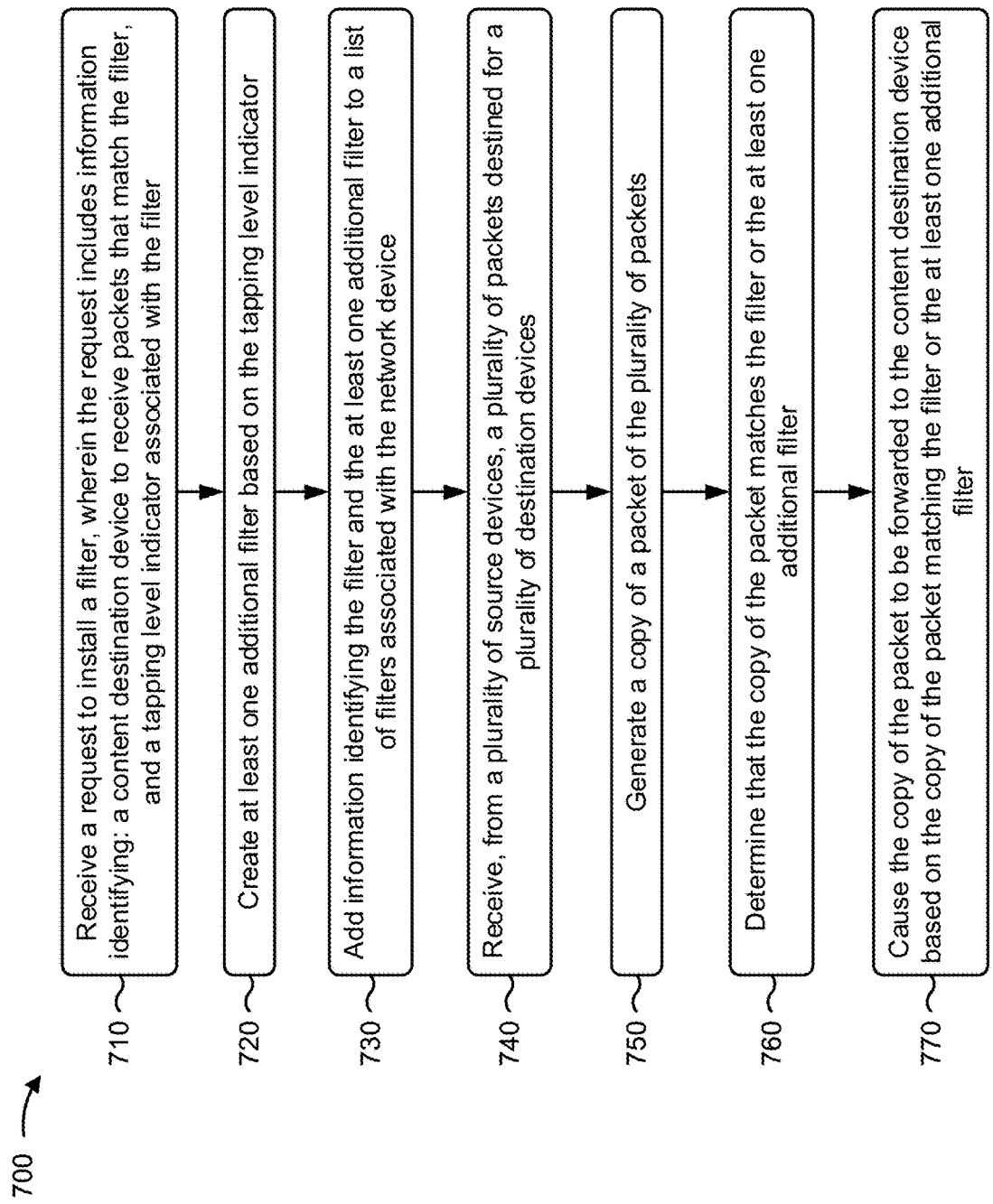

US 11,412,007 B2

LAWFULLY INTERCEPTING TRAFFIC AND PROVIDING THE TRAFFIC TO A CONTENT DESTINATION BASED ON CHAINED TRAFFIC TAPPING

BACKGROUND

Lawful interception includes obtaining network traffic pursuant to a lawful authority for the purpose of analysis and/or evidence. Such traffic may include signaling or network management information or content of communications.

SUMMARY

According to some implementations, a method may include receiving a request to install a filter, wherein the request may include information identifying a first source address, a first destination address, a content destination device to receive packets that match the filter, and a tapping level indicator associated with the filter. The method may include creating at least one additional filter, based on the tapping level indicator, by setting the first destination address as a second source address for the at least one additional filter, determining one or more third destination addresses that are destinations for packets with the second source address, and setting the one or more third destination addresses as one or more third source addresses for the at least one additional filter. The method may include adding information identifying the filter and the at least one additional filter to a list of filters, and receiving, from a plurality of source devices, a plurality of packets destined for a plurality of destination devices. The method may include generating a copy of a packet of the plurality of packets, and determining that the copy of the packet matches the filter or the at least one additional filter. The method may include causing the copy of the packet to be forwarded to the content destination device based on the copy of the packet matching the filter or the at least one additional filter.

According to some implementations, a network device may include one or more memories, and one or more processors to receive a request to install a filter, wherein the request may include information identifying a first source address, a first destination address, a content destination device to receive packets that match the filter, and a tapping level indicator associated with the filter. The one or more processors may create at least one additional filter, based on the tapping level indicator, by setting the first destination address as a second source address for the at least one additional filter. The one or more processors may add information identifying the filter and the at least one additional filter to a list of filters associated with the network device, and may receive, from a plurality of source devices, a plurality of packets destined for a plurality of destination devices. The one or more processors may generate a copy of a packet of the plurality of packets and may determine that the copy of the packet matches the filter or the at least one additional filter. The one or more processors may cause the copy of the packet to be forwarded to the content destination device based on the copy of the packet matching the filter or the at least one additional filter.

According to some implementations, a non-transitory computer-readable medium may store one or more instructions that, when executed by one or more processors of a network device, may cause the one or more processors to receive a request to install a filter, wherein the request may include information identifying a content destination device to receive packets that match the filter, and a tapping level indicator associated with the filter. The one or more instructions may cause the one or more processors to create at least one additional filter based on the tapping level indicator, and add information identifying the filter and the at least one additional filter to a list of filters associated with the network device. The one or more instructions may cause the one or more processors to receive, from a plurality of source devices, a plurality of packets destined for a plurality of destination devices, and generate a copy of a packet of the plurality of packets. The one or more instructions may cause the one or more processors to determine that the copy of the packet matches the filter or the at least one additional filter, and cause the copy of the packet to be forwarded to the content destination device based on the copy of the packet matching the filter or the at least one additional filter.

BRIEF DESCRIPTION OF THE DRAWINGS

FIGS. 1A-1G are diagrams of one or more example implementations described herein.

FIGS. 5-7 are flow charts of example processes for lawfully intercepting traffic and providing the traffic to a content destination based on chained traffic tapping.

DETAILED DESCRIPTION

Figure 1A:
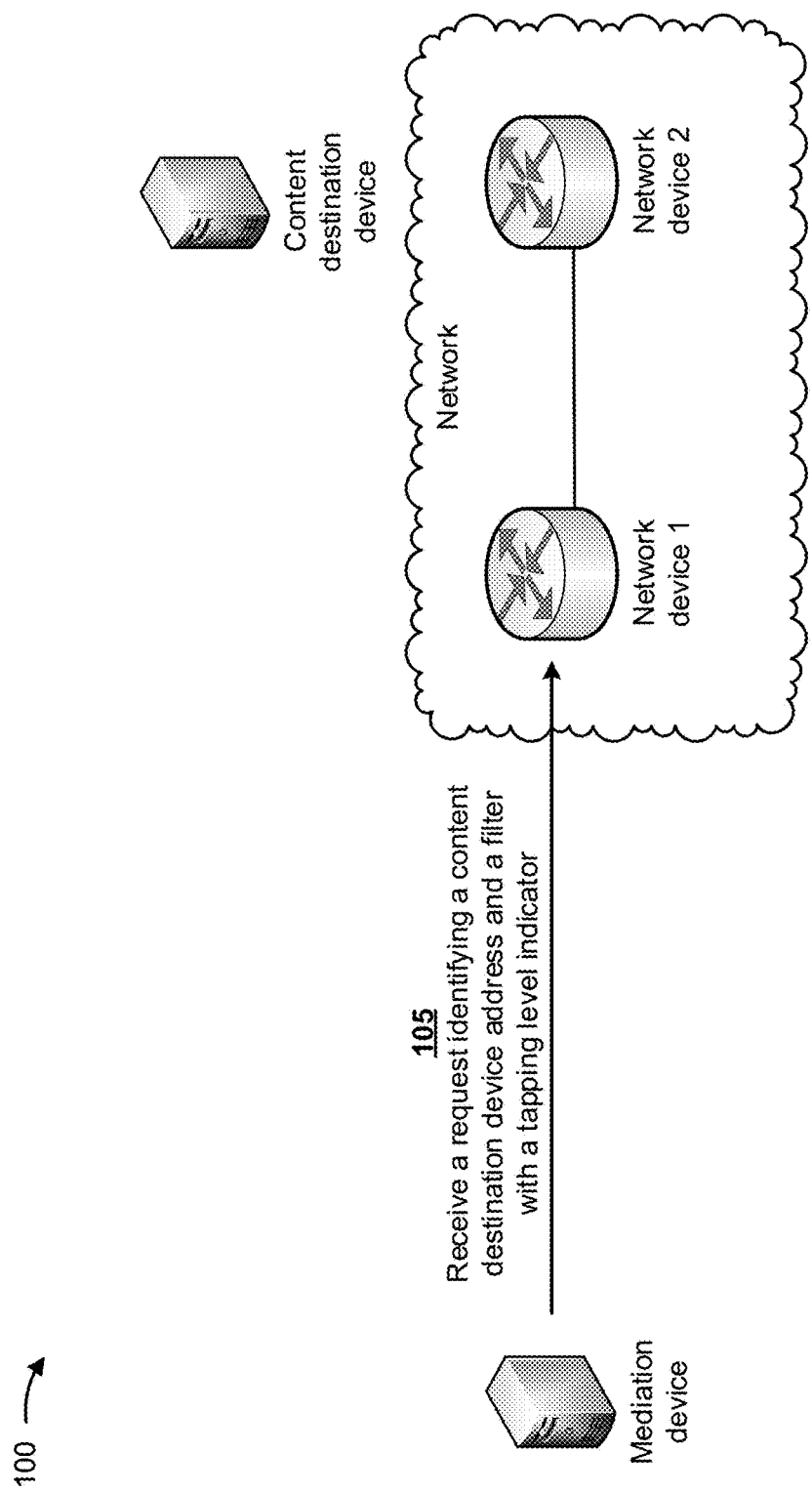

The following detailed description of example implementations refers to the accompanying drawings. The same reference numbers in different drawings may identify the same or similar elements.

Network traffic may be lawfully intercepted at a network device (e.g., a router, a firewall, a switch, a gateway, and/or the like) via flow tapping. The flow tapping copies or mirrors traffic that passes between two network devices. The original traffic is forwarded toward a destination and the copied traffic is forwarded to a content destination device that analyzes the copied traffic. The content destination device may include a content destination device identified by a law enforcement authority (e.g., a police department, a government agency, and/or the like). Network devices are only capable of tapping traffic (e.g., packets) based on a specific set of defined parameters, such as a source Internet protocol (IP) address, a destination IP address, a source port, a destination port, and/or the like.

Currently, flow tapping is triggered for specific packet features (e.g., a set of n-tuples). However, if a traffic flow originating from a destination IP address is suspect and requires more evidence associated with traffic flows to other destination IP addresses, then an additional request for flow tapping (e.g., with the destination IP address set as a source IP address) needs to be provided to the network device. Thus, current techniques waste computing resources (e.g., processing resources, memory resources, communication resources, and/or the like), networking resources, and/or the like associated with generating additional requests for flow tapping, communicating the additional requests, processing the additional requests, and/or the like.

Some implementations described herein provide a network device that intercepts traffic and provides the traffic to a content destination device based on chained traffic tapping. For example, the network device may receive a request to install a filter, where the request may include information identifying a first source address, a first destination address, a content destination device to receive packets that match the filter, and a tapping level indicator associated with the filter. The network device may create at least one additional filter, based on the tapping level indicator, by setting the first destination address as a second source address for the at least one additional filter, determining one or more third destination addresses that are destinations for packets with the second source address, and/or setting the one or more third destination addresses as one or more third source addresses for the at least one additional filter. The network device may add information identifying the filter and the at least one additional filter to a list of filters associated with the network device, and may receive, from a plurality of source devices, a plurality of packets destined for a plurality of destination devices. The network device may generate a copy of a packet of the plurality of packets, and may determine that the copy of the packet matches the filter or the at least one additional filter. The network device may cause the copy of the packet to be forwarded to the content destination device based on the copy of the packet matching the filter or the at least one additional filter.

In this way, network traffic may be intercepted for analysis and provided to a content destination device based on chained traffic tapping, which reduces or prevents mediation devices from generating additional requests for flow tapping. This, in turn, conserves computing resources (e.g., processing resources, memory resources, communication resources, and/or the like), networking resources, and/or the like that would otherwise have been wasted in generating additional requests for flow tapping, communicating the additional requests, processing the additional requests, and/or the like.

FIGS. 1A-1G are diagrams of one or more example implementations 100 described herein. As shown in FIG. 1A, a mediation device may communicate and exchange traffic with a network. The network may include multiple network devices (e.g., routers, firewall, switches, gateways, and/or the like), such as a first network device (e.g., network device 1), a second network device (e.g., network device 2), and/or the like. The network devices may communicate with a content destination device to which tapped traffic may be provided, as described herein. The two network devices shown in FIGS. 1A-1G are provided merely as examples of network devices, and, in practice, the network may include additional network devices. The mediation device and/or the content destination device may be associated with one or more entities or law enforcement authorities (e.g., police departments, government agencies, corporations, network operators, educational institutions, and/or the like) and may be utilized by the law enforcement authorities to request, from the network, particular traffic that is to be monitored for the purpose of analysis and/or evidence.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As further shown in FIG. 1A, and by reference number 105, the first network device may receive, from the mediation device, a request to install a filter. The request may also include information identifying a first source address, a first destination address, a content destination device to receive traffic (e.g., packets) that matches the filter, a tapping level indicator (e.g., indicating a chained tapping level) associated with the filter, and/or the like. The filter may include parameters used to identify traffic (e.g., packets) to tap, such as a source IP address, a destination IP address, a source port identifier, a destination port identifier, and/or the like. The mediation device may include a device that requests specific traffic (e.g., electronic data and/or voice data transferred over the network) to be monitored based on the filter.

A user of the mediation device may define the chained tapping level, and may utilize the mediation device to provide, via the request and to the first network device, information identifying the chained tapping level (e.g., the tapping level indicator), and/or the like. In some implementations, the mediation device may provide such information via a new field (e.g., X-JTap-Chained-Tapping, shown below in bold) provided in the request, an example of which is shown below:

ADD DTCP/0.8
Csource-ID: ftapI
Cdest-ID: cd1
Source Address: 50.50.50.2
Dest-Address: 60.60.60.2
Priority: 2
X-JTap-Chained-Tapping: Level 3
Flags: STATIC
Seq: 1
Authentication-Info:
  d3f1bb1a12569b94421d76605928f3cfc7eb6cfd
DTCP/0.8 200 OK
SEQ: 1
CRITERIA-ID: 1
TIMESTAMP: 2019-07-29 04:22:48.368
AUTHENTICATION-INFO:
  6b720b9997e01c39bb0d516cf5bdb525483808c0

In some implementations, the request to install the filter may prevent identification of the mediation device that generated the request to install the filter. For example, the mediation device may not be identified for security reasons, but may be permitted to access the network via a security mechanism (e.g., a security login). In some implementations, the first network device may provide, to the mediation device, a response confirming that the request was received.

The request to install the filter may identify authorization (e.g., legal authorization, such as a court order, a warrant, and/or the like) for requesting the filter. For example, the request may identify the source of the authorization for making the request. The first network device may confirm that the request includes the proper authorization for requesting the filter before creating the filter. In some implementations, the first network device may request, from the mediation device, an identification of the authorization for making the request.

In some implementations, the mediation device may send the request to install the filter via a secure protocol (e.g., a dynamic tasking control protocol (DTCP)), and the first network device may receive the request to install the filter via the DTCP. DTCP is a secure protocol that utilizes a message-based interface by which an authorized client can connect to a network device and issue dynamic requests for data. Such a request may contain, among other parameters, packet matching criteria that may apply to certain packets flowing through the network device, and may instruct the network device to perform mirroring (e.g., to send copies of packets matching the criteria to a specified location for further inspection or other action). Additionally, DTCP contains a security architecture to address client or server spoofing, as well as replay prevention.

In some implementations, the mediation device may send the request as a DTCP ADD message. A DTCP ADD message may trigger mirroring of network traffic (e.g., matching the filter criteria) by the first network device, and may include fields that trigger the first network device to begin mirroring packets, fields that identify where to send the mirrored packets, and/or the like. The DTCP ADD message may additionally include one or more fields that instruct the first network device to filter traffic that satisfies the parameters included in the filter.

Although FIG. 1A shows one mediation device and one content destination device, in practice, the first network device may be associated with hundreds, thousands, and/or the like of mediation devices and/or content destination devices, and the mediation devices and/or content destination devices may be associated with hundreds, thousands, and/or the like of law enforcement authorities.

Figure 1B:
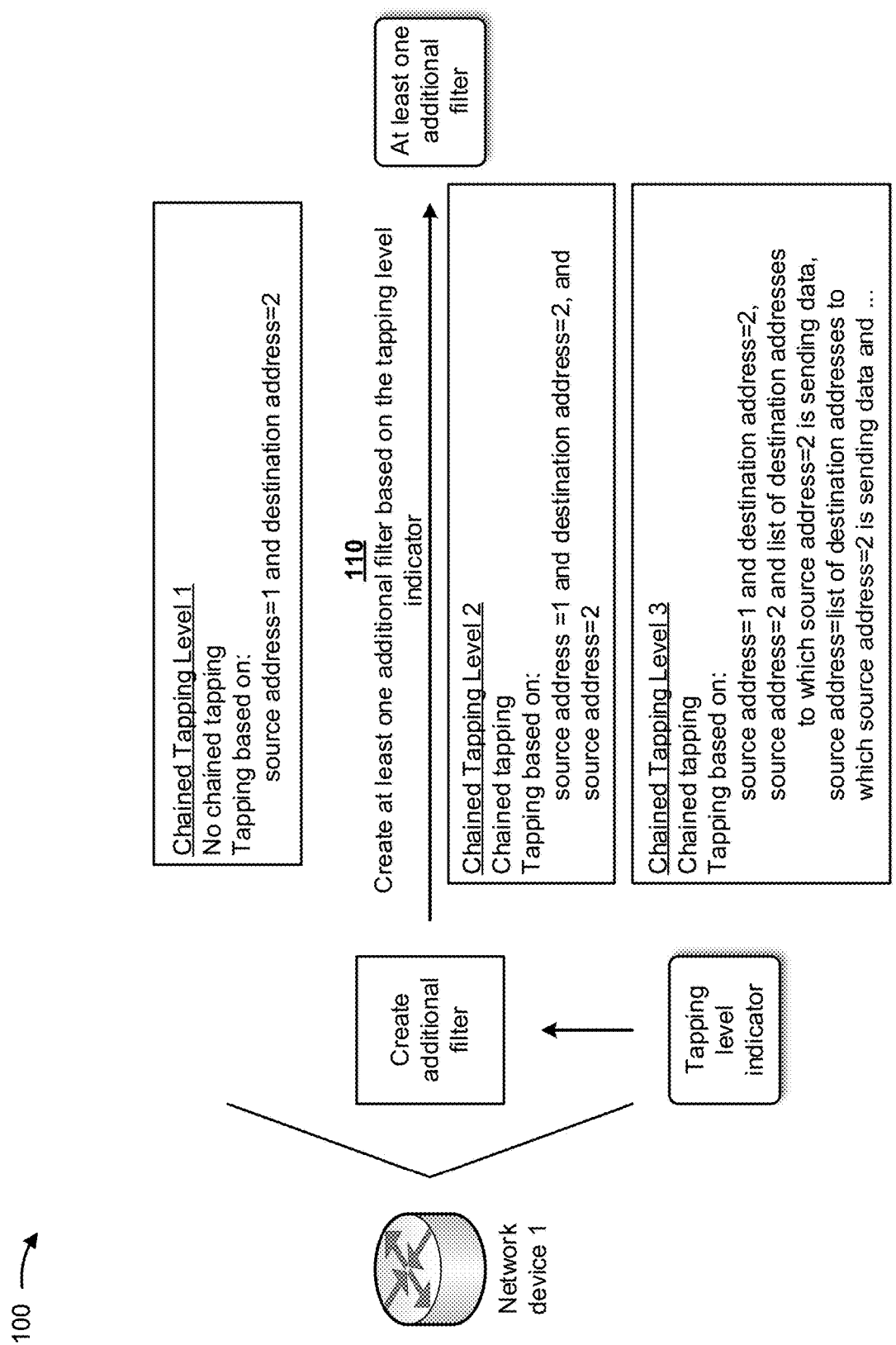

As shown in FIG. 1B, and by reference number 110, the first network device may create at least one additional filter, based on the tapping level indicator (e.g., indicating the chained tapping level) identified in the request. In some implementations, the default chained tapping level may be level 1. Chained tapping level of 1 may indicate that there is to be no chained tapping (e.g., no additional filter). As such, if the tapping level indicator indicates a chained tapping level of 1, the first network device may not create the at least one additional filter.

The chained tapping level may refer to a degree of separation from the source address and the destination address identified in the request. For example, if the request identifies a source address of A and a destination address of B and a chained tapping level of 1, a filter corresponding to the request may cause all traffic sent from A to B to be copied and sent to the content destination device (e.g., one degree of separation away from A). If the same request instead identifies a chained tapping level of 2, a filter and at least one additional filter corresponding to the request may cause all traffic sent from A to B and all traffic sent from B to be copied and sent to the content destination device (e.g., two degrees of separation away from A). If the same request instead identifies a chained tapping level of 3, a filter and at least one additional filter corresponding to the request may cause all traffic sent from A to B, all traffic sent from B to C (wherein C refers to all destination addresses that receive traffic from B), and all traffic sent from C to be copied and sent to the content destination device (e.g., three degrees of separation away from A). Similar additional filters may be created for higher levels of chained tapping.

In some implementations, the first network device may create the at least one additional filter based on the request and without receiving any additional request (e.g., the at least one additional filter is created with no other requests received by the first network device, the at least one additional filter is created based only on the original request (e.g., described with respect to reference number 105 in FIG. 1A), and/or the like).

In some implementations, the first network device may create the at least one additional filter based on identifying, in the request, a chained tapping level higher than 1 (e.g., 2 or higher). The first network device may automatically determine one or more additional source address(es) and/or one or more additional destination address(es) for the at least one additional filter to be identified in the at least one additional filter based on the chained tapping level. The number of additional filters (e.g., the number of additional source addresses and/or additional destination addresses to be identified) may be based on the chained tapping level.

For example, the request may be a request to install a filter wherein the source address is identified as a first source address and the destination address is identified as a first destination address. The request may also indicate (via the tapping level indicator) that the chained tapping level is level 2. The first network device may create the at least one additional filter by setting the destination address of the request (e.g., the first destination address) as the source address identified by the at least one additional filter. The first network device may create the filter, based on the request, identifying the source address as the first source address and the destination address as the first destination address. The first network device may create the at least one additional filter, based on the chained tapping level of level 2, identifying the source address identified in the at least one additional filter as the first destination address. As such, in the example of a chained tapping level of level 2, tapping may be based on: 1) a source address identified as the first source address of the request and a destination address identified as the first destination address of the request (e.g., the filter, chained tapping level 1); and 2) a source address identified as the first destination address of the request (e.g., the at least one additional filter, chained tapping level 2).

In another example, assume that the request is the same request as above (e.g., the source address is identified as the first source address and the destination address is identified as the first destination address), but the tapping level indicator in the request identifies that the chained tapping level is level 3. The first network device may create the filter and a first additional filter in a similar manner as described above (e.g., identifying the source address as the first source address and the destination address as the first destination address for the filter, and identifying the source address as the first destination address for the first additional filter). The first network device may, to create one or more second additional filters, monitor traffic (e.g., packets) sent from the first destination address to determine one or more second destination addresses (e.g., one or more destination addresses that receive traffic from the first destination address). The first network device may create the one or more second additional filters, based on the chained tapping level of level 3, identifying the source address(es) as the one or more second destination addresses. As such, in the example of a chained tapping level of level 3, tapping may be based on: 1) a source address identified as the first source address of the request and a destination address identified as the first destination address of the request (e.g., the filter, chained tapping level 1); 2) a source address identified as the first destination address of the request (e.g., the first additional filter, chained tapping level 2); and 3) one or more source addresses identified as the one or more second destination addresses (e.g., the one or more second additional filters, chained tapping level 3).

In some implementations, the first network device may compile a list of the one or more second destination addresses (e.g., a list of destination addresses that receive traffic from the first destination address). The list may identify a plurality of second destination addresses. The first network device may create the one or more second additional filters, based on a chained tapping level of level 3, by identifying each of the one or more second destination addresses as a destination address associated with the source address of the first destination address and by creating one or more additional filters identifying each of the one or more second destination addresses as a separate source address.

The first network device may create the at least one additional filter for chained tapping levels higher than 3 in a similar manner as described above. For example, the first network device may monitor traffic sent from each of the one or more second destination addresses to determine one or more third destination addresses. The first network may, based on a chained tapping level of level 4, create one or more third additional filter identifying the one or more third destination addresses as separate source addresses to be monitored.

Figure 1C:
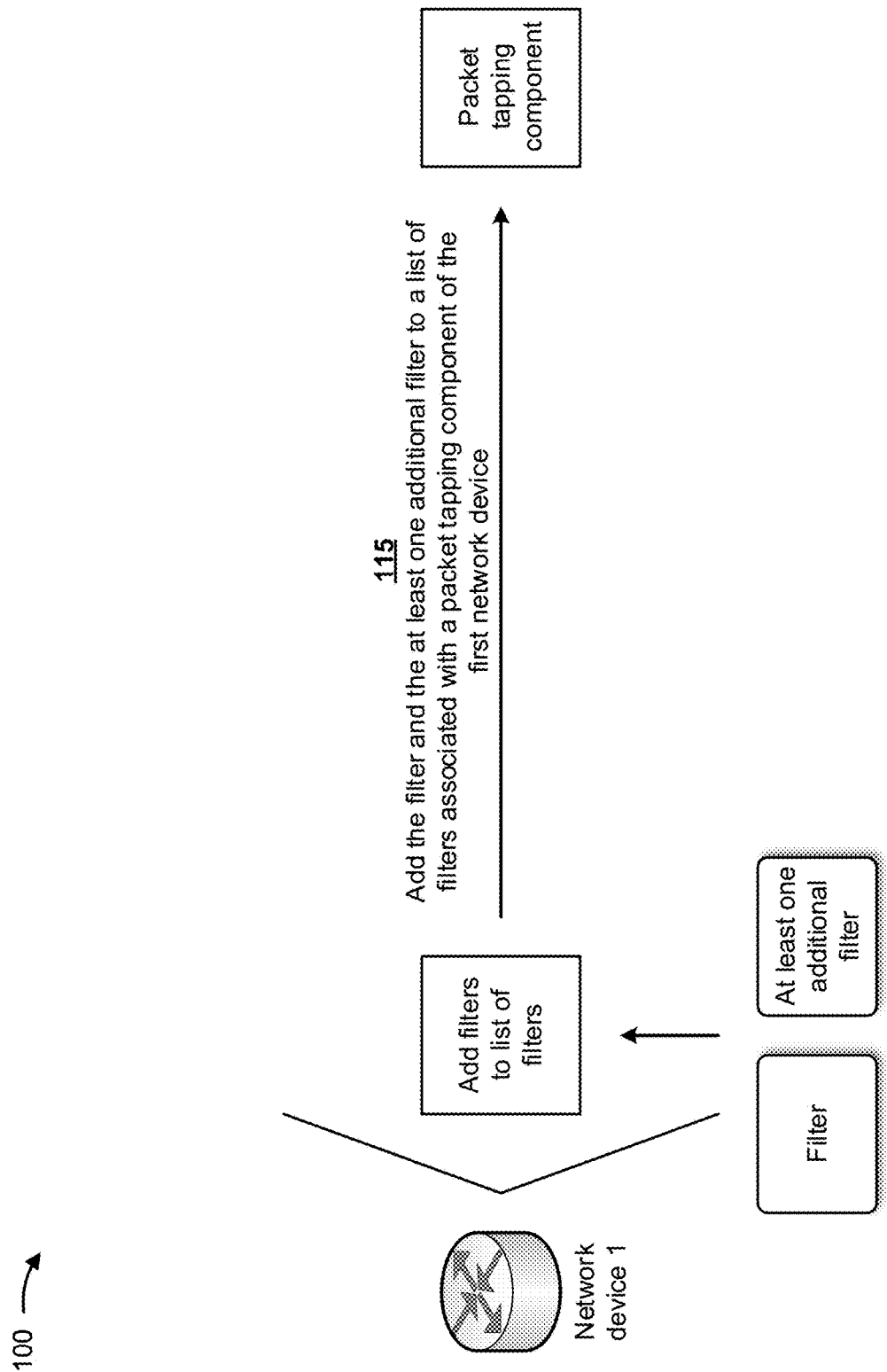

As shown in FIG. 1C, and by reference number 115, the first network device may add the first filter and the at least one additional filter to a list of filters associated with a packet tapping component (e.g., that performs packet inspection and packet tapping of packets, described below) of the first network device. For example, the first network device may store the filter and the at least one additional filter in a data structure (e.g., a database, a table, a list, and/or the like), associated with the first network device, that maintains hundreds, thousands, millions, and/or the like of different filters.

In this way, the first network device may implement filters that can identify packets that particular law enforcement authorities wish to monitor without the particular law enforcement authorities making a separate additional request for each filter. In some implementations, filters installed for one entity (e.g., a law enforcement authority corresponding to one mediation device) may not be visible to or accessible by other entities (e.g., other law enforcement authorities corresponding to other mediation devices), and the first network device may not reveal identities of monitored targets. In this way, an entity who has been authorized (e.g., legally authorized) to request the filter(s) may be the only entity who can view the filter(s) created pursuant to the request. As such, the first network device enhances the privacy of a user associated with network traffic by ensuring that an entity who has not been authorized to view the network traffic associated with the user cannot view any filter(s) associated with the user (or a device associated with the user).

Figure 1D:
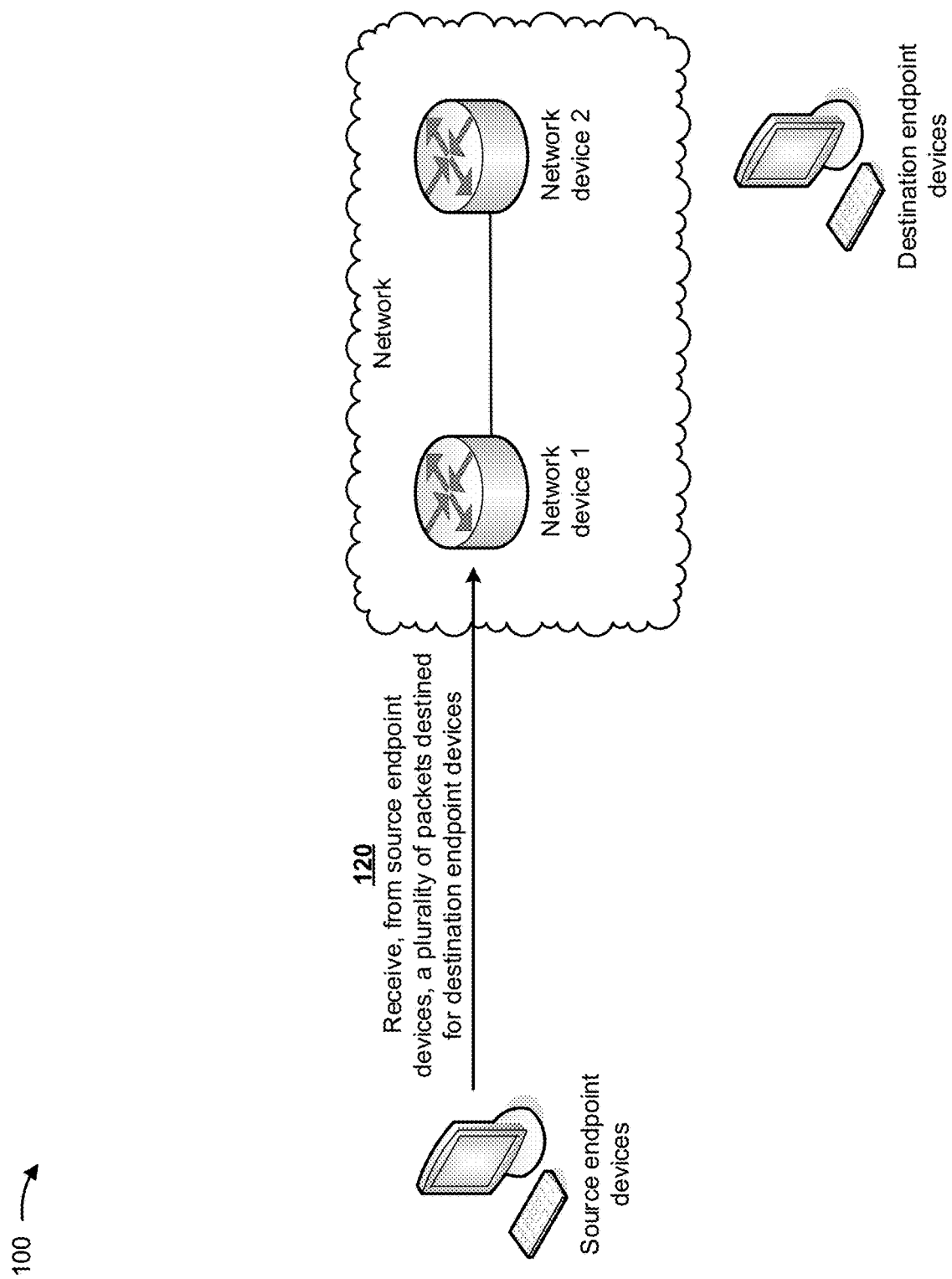

As shown in FIG. 1D, and by reference number 120, the first network device may receive, from one or more source endpoint devices, a plurality of traffic (e.g., packets) destined for one or more destination endpoint devices. A source endpoint device may be a source device providing electronic data and/or voice data over the network, and a destination endpoint device may be a destination device for the electronic data and/or voice data.

In some implementations, the source endpoint device and the destination endpoint device may be parties to a voice conversation; the source endpoint device may include a server and the destination endpoint device may include a client served by the server via electronic data transmitted over the network; the source endpoint device and the destination endpoint device may be parties to a short message service (SMS) text message conversation; and/or the like. In some implementations, the packet may include signaling information (e.g., information for establishing, controlling, and/or terminating a communication, such as a telephone call), network management information (e.g., network performance information, network provisioning information, network quality of service information, and/or the like), content of communications, and/or the like.

As shown in FIG. 1E, and by reference number 135, a packet forwarding component of the first network device may generate a copy of a packet received from the source endpoint device, and may provide the copy of the packet to the packet tapping component. In some implementations, the packet forwarding component may filter a particular type of packet (e.g., content for which lawful interception is expected to be warranted and/or appropriate, such as an Internet search, a telephone call, a text messaging session, and/or the like), and may only copy the particular type of packet. In this way, the first network device conserves computing resources (e.g., processing resources, memory resources, and/or the like) that would otherwise have been wasted copying and monitoring packets for which lawful interception is unlikely to be warranted or appropriate. Alternatively, the packet forwarding component may copy all packets received by the first network device (e.g., depending on traffic load associated with the first network device), and may provide the copies of all packets received to the packet tapping component, which may conserve computing resources that would otherwise have been wasted filtering packets prior to packet tapping during light traffic load conditions.

As further shown in FIG. 1E, and by reference number 130, the packet forwarding component may cause the plurality of packets to be forwarded toward a destination associated with the packet. For example, the packet forwarding component may cause the plurality of packets to be forwarded toward the one or more destination endpoint devices.

The first network device (e.g., the packet forwarding component) may cause the plurality of packets to be forwarded toward the respective destination (e.g., the one or more destination endpoint devices) associated with each packet of the plurality of packets. For example, the first network device may forward a packet to the second network device, and the second network device may forward the packet toward a destination endpoint device. In this way, communication may continue between the source endpoint device and the destination endpoint device without being disrupted by packet tapping or monitoring operations. This improves network operations relative to a technique that inspects packets without copying the packets.

Figure 1F:
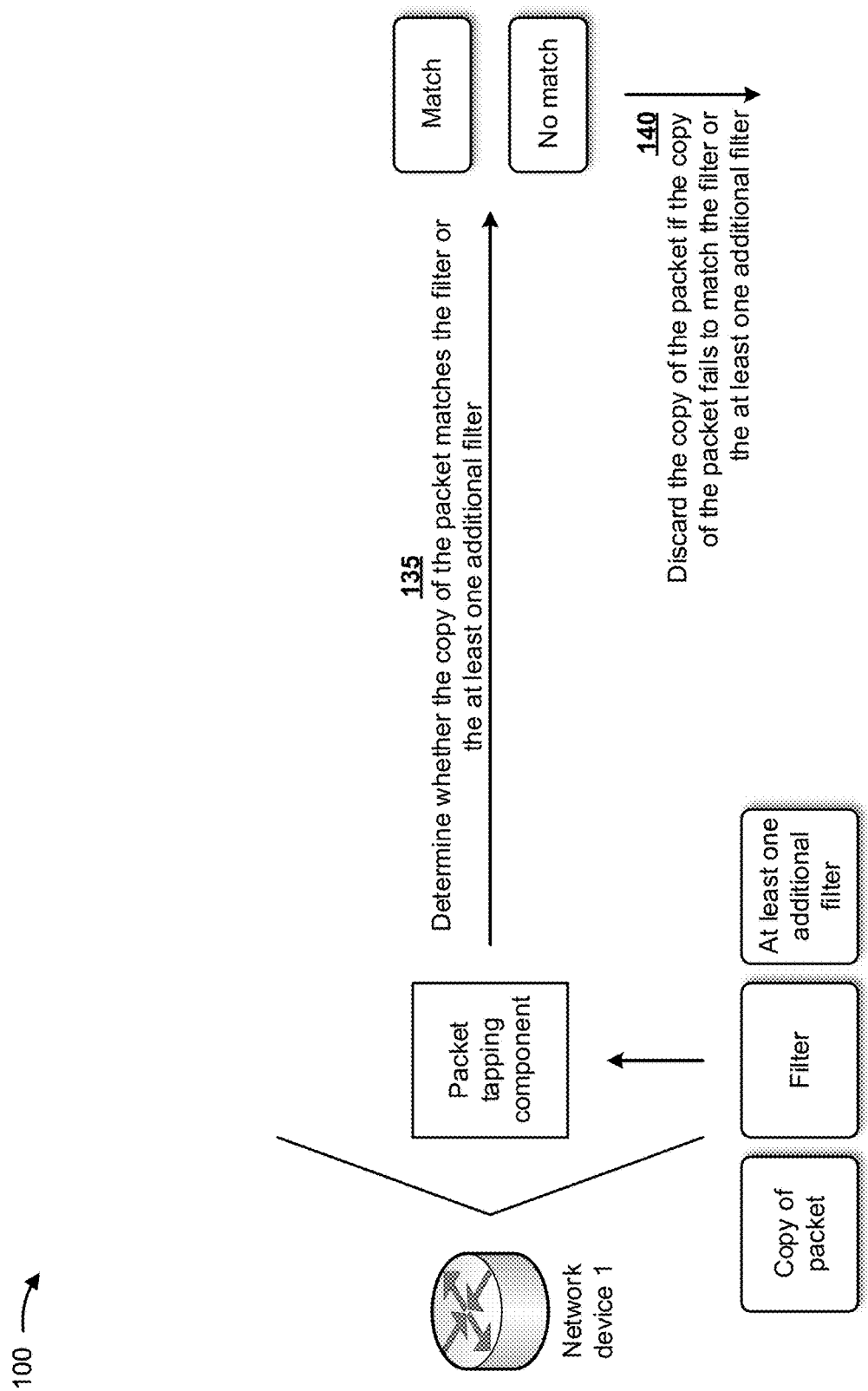

As shown in FIG. 1F, and by reference number 135, the packet tapping component of the first network device may determine whether the copy of the packet matches the filter or the at least one additional filter. The packet tapping component of the first network device may identify a packet feature associated with the copy of the packet. The packet feature may include a source IP address (e.g., an address of the source endpoint device), a destination IP address (e.g., an address of the destination endpoint device), a source port identifier (e.g., of a port of the source endpoint device), a destination port identifier (e.g., of a port of the destination endpoint device), and/or the like.

The packet tapping component of the first network device may determine whether the packet feature associated with the copy of the packet matches or corresponds to the filter and/or the at least one additional filter. In some implementations, the packet tapping component may determine that the packet feature matches or corresponds to the filter and/or the at least one additional filter when the packet feature matches one or more of the parameters of the filter and/or the at least one additional filter. For example, if the source IP address of the source endpoint device is the packet feature and the filter and/or the at least one additional filter includes a sole parameter identifying the source IP address of the source endpoint device, the packet tapping component may determine that the packet feature matches the filter and/or the at least one additional filter. Conversely, if the packet feature fails to match all of the parameters of the filter and/or the at least one additional filter, the packet tapping component may determine that the packet feature fails to match the filter and/or the at least one additional filter.

In some implementations, the packet tapping component may include an adaptive services physical interface card that is configured to perform packet tapping. Packet tapping may include monitoring traffic on a network in order to aid analysis of the traffic. For example, a third party (e.g., a law enforcement authority) may wish to monitor traffic between two points in a network. If the network between the two points includes a network device, the network device may function as a network tap that enables the monitoring by the third party. Alternatively, if the network between the two points does not include a network device, a new network device may be installed between the two points as the network tap. For example, the packet tapping component of the first network device may compare information in the list of filters (e.g., which includes the filter and the at least one additional filter) with the copy of the packet, and may determine whether the packet feature associated with the copy of the packet matches or corresponds to the packet feature listed in the filter and/or the at least one additional filter. The packet tapping component may determine a match or a no match based on this determination.

As further shown in FIG. 1F, and by reference number 140, if the packet tapping component of the first network device determines there is no match between the copy of the packet and the filter and no match between the copy of the packet and the at least one additional filter, the first network device may discard and/or delete the copy of the packet. If the packet tapping component of the first network device determines there is no match between the copy of the packet and the filter and no match between the copy of the packet and the at least one additional filter, the packet tapping component of the first network device may prevent the copy of the packet from being forwarded to the content destination device. For example, the packet tapping component may discard the copy of the packet.

Figure 1G:
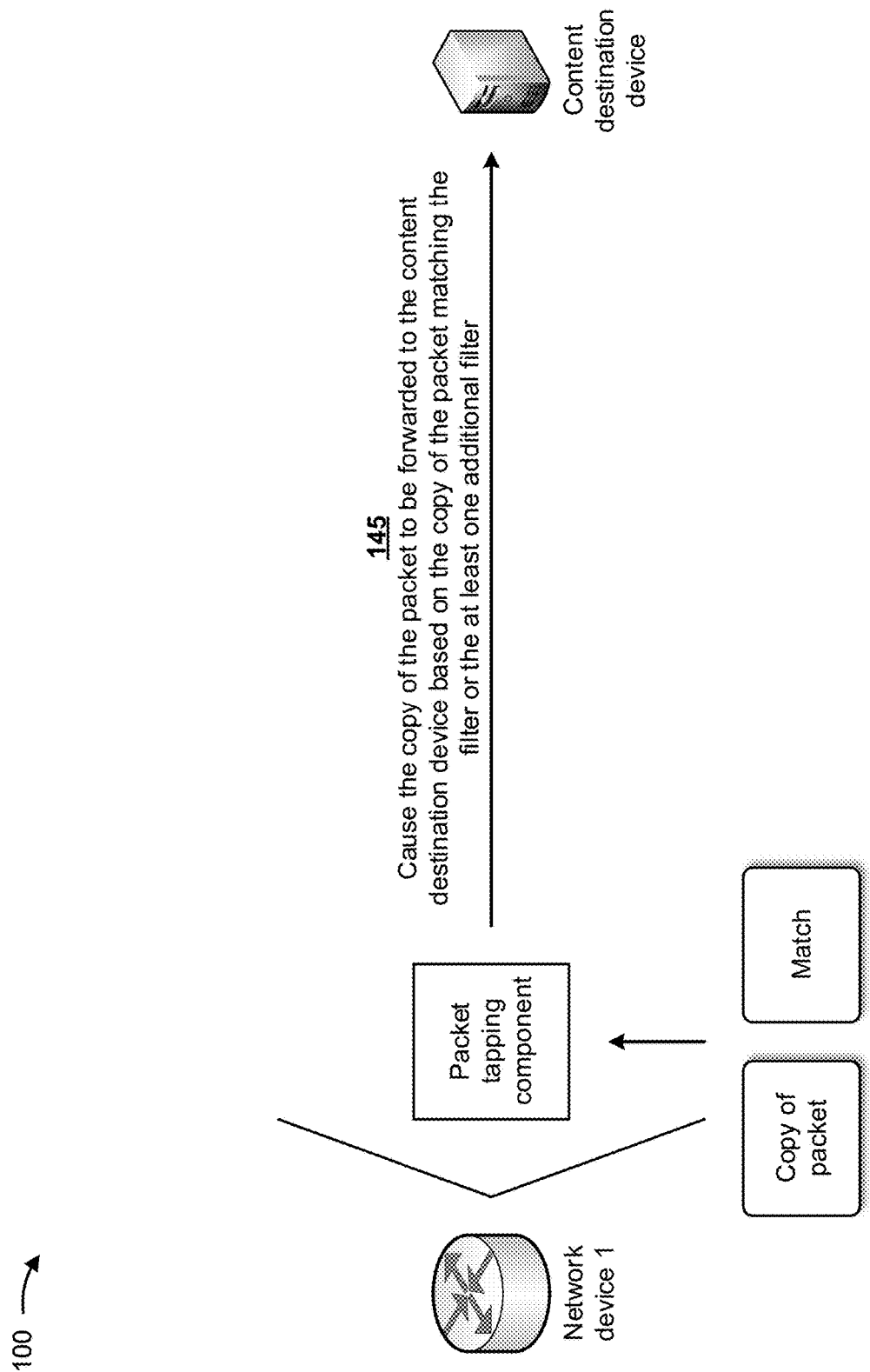

As shown in FIG. 1G, and by reference number 145, if the packet feature associated with the copy of the packet matches or corresponds to the filter and/or the at least one additional filter, the packet tapping component of the first network device may cause the copy of the packet to be forwarded to the content destination device. As described above, a location (e.g., an address and/or a port) associated with the content destination device may be provided with the request to add the filter. The packet tapping component may utilize this location to cause the copy of the packet to be forwarded to the content destination device. In some implementations, the packet tapping component of the first network device may cause the copy of the packet to be securely forwarded to the content destination device via an encapsulation technique (e.g., Internet Protocol (IP)-User Datagram Protocol (UDP) encapsulation), may cause the copy of the packet to be securely forwarded to another network device connected to the content destination device via an IP security tunnel, and/or the like.

The content destination device may receive, from the first network device, the copy of the packet. The content destination device may store the copy of the packet. The content destination device may analyze the packet to determine the contents of the packet, such as to determine the content of a communication.

In some implementations, the content destination device may be associated with a law enforcement authority authorized to perform lawful interception. For example, the content destination device may be associated with a same law enforcement authority that is associated with the mediation device that provided the request to install the filter. In some implementations, the mediation device and the content destination device may be physically located on a same host system or device. Alternatively, the mediation device and the content destination device may be physically located on different host systems or devices. In some implementations, receipt of the copy of the packet may cause the content destination device to analyze the copy of the packet.

Although some implementations are described as filtering based on certain packet data, in some implementations, network traffic may be filtered based on other information, such as a user identifier, an end point device identifier, a network address (e.g., an IP address), an account identifier, transaction card identifier, and/or the like.

In some implementations, the packet tapping component may compare the copy of the packet to all filters included in the list of filters, and may generate additional copies of the packet if the copy of the packet matches more than one filter (e.g., as many copies of the packet as match to the filters). The first network device may forward the multiple copies of the packet to respective content destination devices. Furthermore, hundreds or thousands of filters may be included in the list of filters, and the packet tapping component may compare the packet feature with each filter included in the list of filters. In some implementations, the packet tapping component may arrange the list of filters in a particular order that may enable efficient comparison of the packet feature with each filter. If the packet feature matches zero filters in the list of filters, the packet tapping component may discard the copy of the packet. If the packet feature matches more than one filter in the list of filters, the packet tapping component may make additional copies of the packet and may forward the copy of the packet and the additional copies of the packet to appropriate content destination devices.

In this way, network traffic may be intercepted for analysis and provided to a content destination device based on chained traffic tapping. This conserves computing resources (e.g., processing resources, memory resources, communication resources, and/or the like), networking resources, and/or the like that would otherwise have been wasted in generating additional requests for flow tapping, communicating the additional requests, processing the additional requests, and/or the like. Furthermore, implementations described herein use a rigorous, computerized process to perform tasks that were not previously performed. For example, currently there does not exist a technique that enables a network device to lawfully intercept traffic and provide the traffic to a content destination based on chained traffic tapping.

As indicated above, FIGS. 1A-1G are provided merely as examples. Other examples may differ from what is described with regard to FIGS. 1A-1G.

Figure 2:
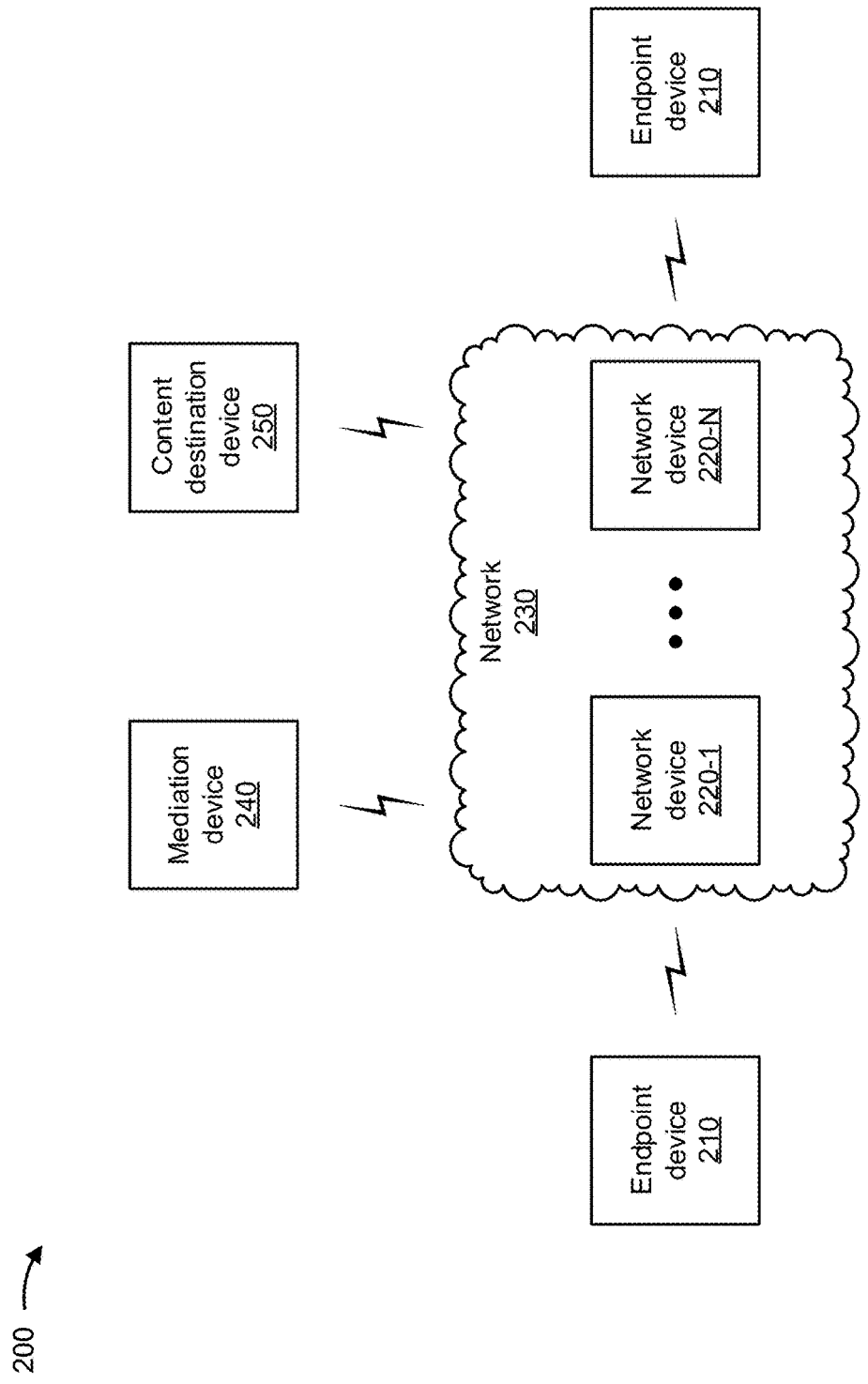
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include multiple endpoint devices 210, a group of network devices 220 (shown as network device 220-1 through network device 220-N), a network 230, a mediation device 240, and a content destination device 250. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, a server device, or a similar type of device. In some implementations, endpoint device 210 may receive network traffic from and/or may provide network traffic to other endpoint devices 210, via network 230 (e.g., by routing packets using network devices 220 as intermediaries).

Network device 220 includes one or more devices capable of receiving, processing, storing, routing, and/or providing traffic (e.g., a packet, other information or metadata, and/or the like) in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Mediation device 240 includes one or more devices capable of receiving, generating, storing, processing, and/or providing information, such as information described herein. For example, mediation device 240 may include a laptop computer, a tablet computer, a desktop computer, a group of server devices, or a similar type of device. Mediation device 240 may be associated with one or more law enforcement authorities (e.g., police departments, government agencies, and/or the like) and may be utilized by the law enforcement authorities to request, from network 230, particular traffic that is to be monitored for the purpose of analysis and/or evidence. In some implementations, mediation device 240 may receive information from and/or transmit information to endpoint device 210 and/or content destination device 250.

Content destination device 250 includes one or more devices capable of receiving, generating, storing, processing, and/or providing information, such as information described herein. For example, content destination device 250 may include a laptop computer, a tablet computer, a desktop computer, a group of server devices, or a similar type of device. Content destination device 250 may be associated with one or more law enforcement authorities and may be utilized by the law enforcement authorities to receive, from network 230, particular traffic that is to be monitored for the purpose of analysis and/or evidence. In some implementations, content destination device 250 may receive information from and/or transmit information to endpoint device 210 and/or mediation device 240.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
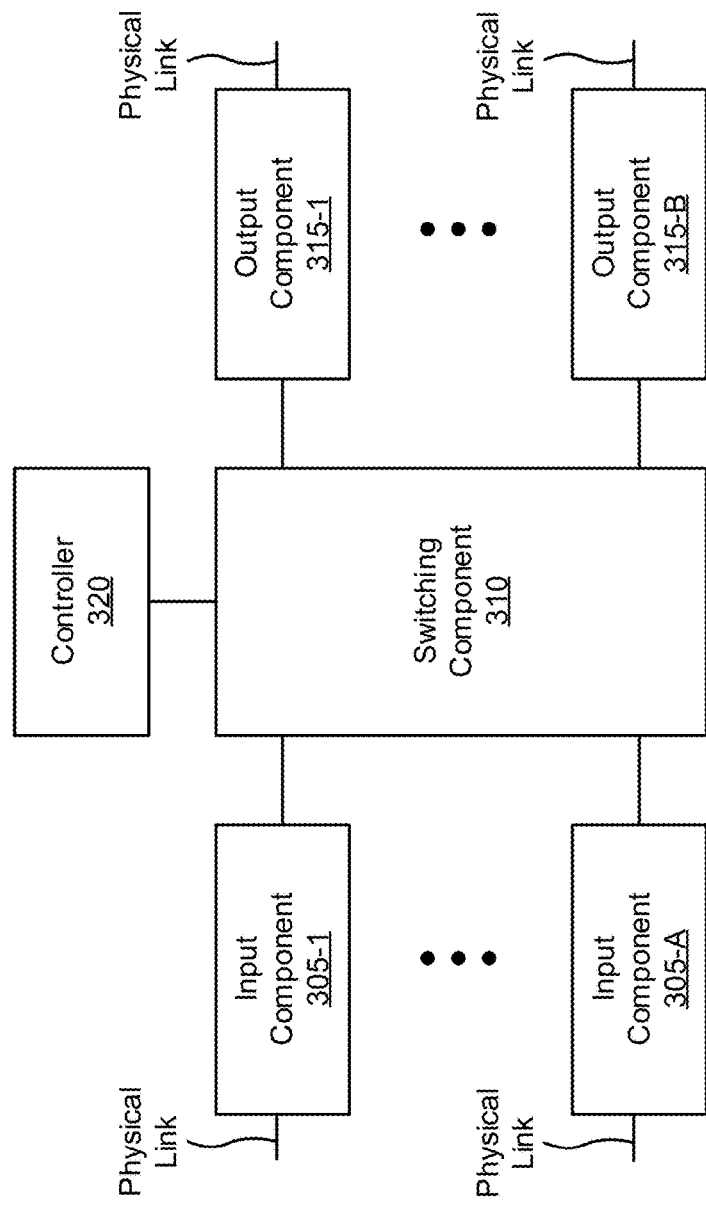
FIGS. 3 and 4 are diagrams of example components of one or more devices of FIG. 2.

FIG. 3 is a diagram of example components of a device 300. Device 300 may correspond to endpoint device 210 and/or network device 220. In some implementations, endpoint device 210 and/or network device 220 may include one or more devices 300 and/or one or more components of device 300. As shown in FIG. 3, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a controller 320.

Input components 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, and/or a combination of software and hardware. In some implementations, controller 320 may include one or more processors that can be programmed to perform a function.

In some implementations, controller 320 may include a random-access memory (RAM), a read only memory (ROM), and/or another type of dynamic or static storage device (e.g., a flash memory, a magnetic memory, an optical memory, and/or the like) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some cases, controller 320 may create a session table based on information determined while initializing a link fault detection session and may forward the session table to input components 305 and/or output components 315.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
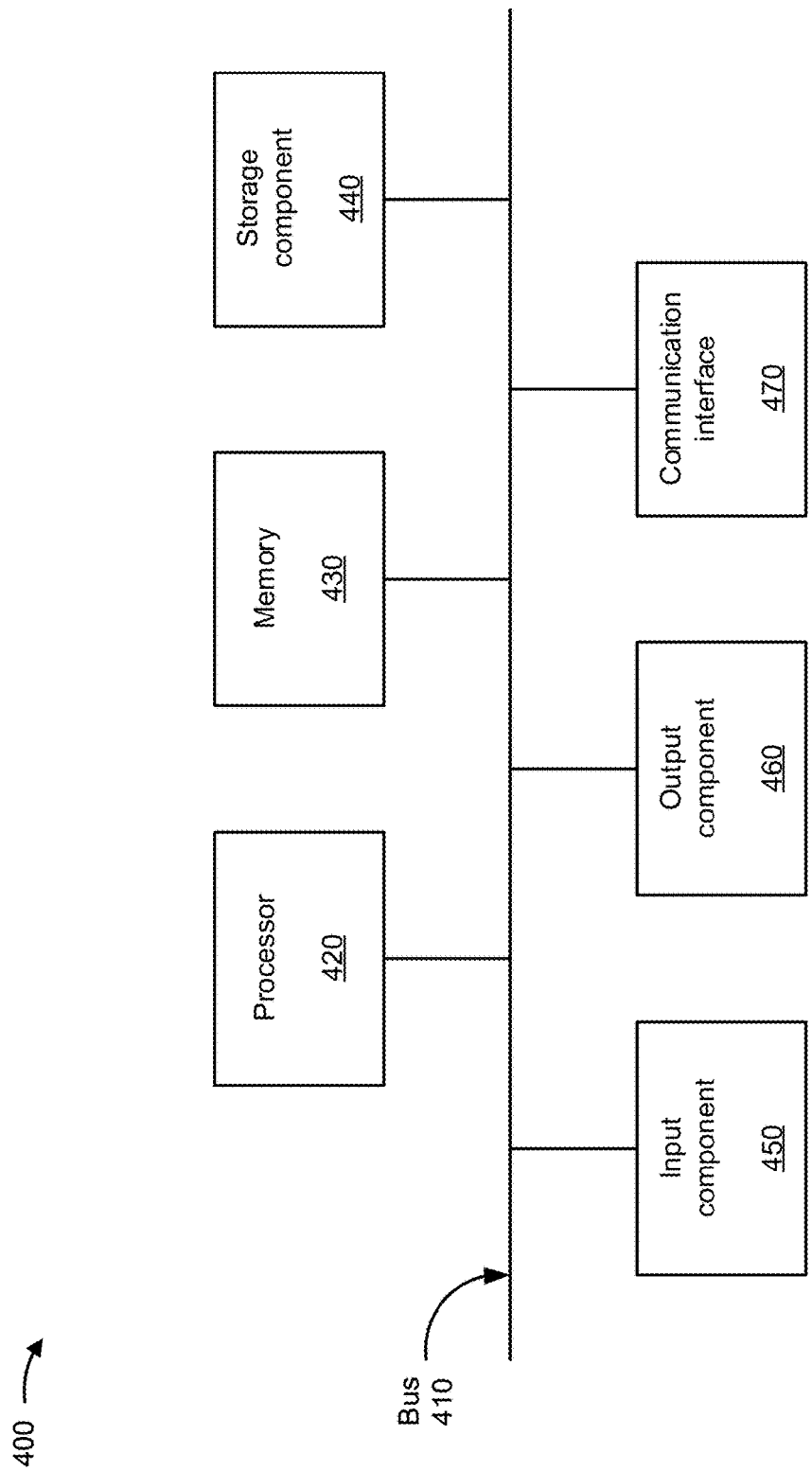

FIG. 4 is a diagram of example components of a device 400. Device 400 may correspond to endpoint device 210, network device 220, mediation device 240, and/or content destination device 250. In some implementations, endpoint device 210, network device 220, mediation device 240, and/or content destination device 250 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
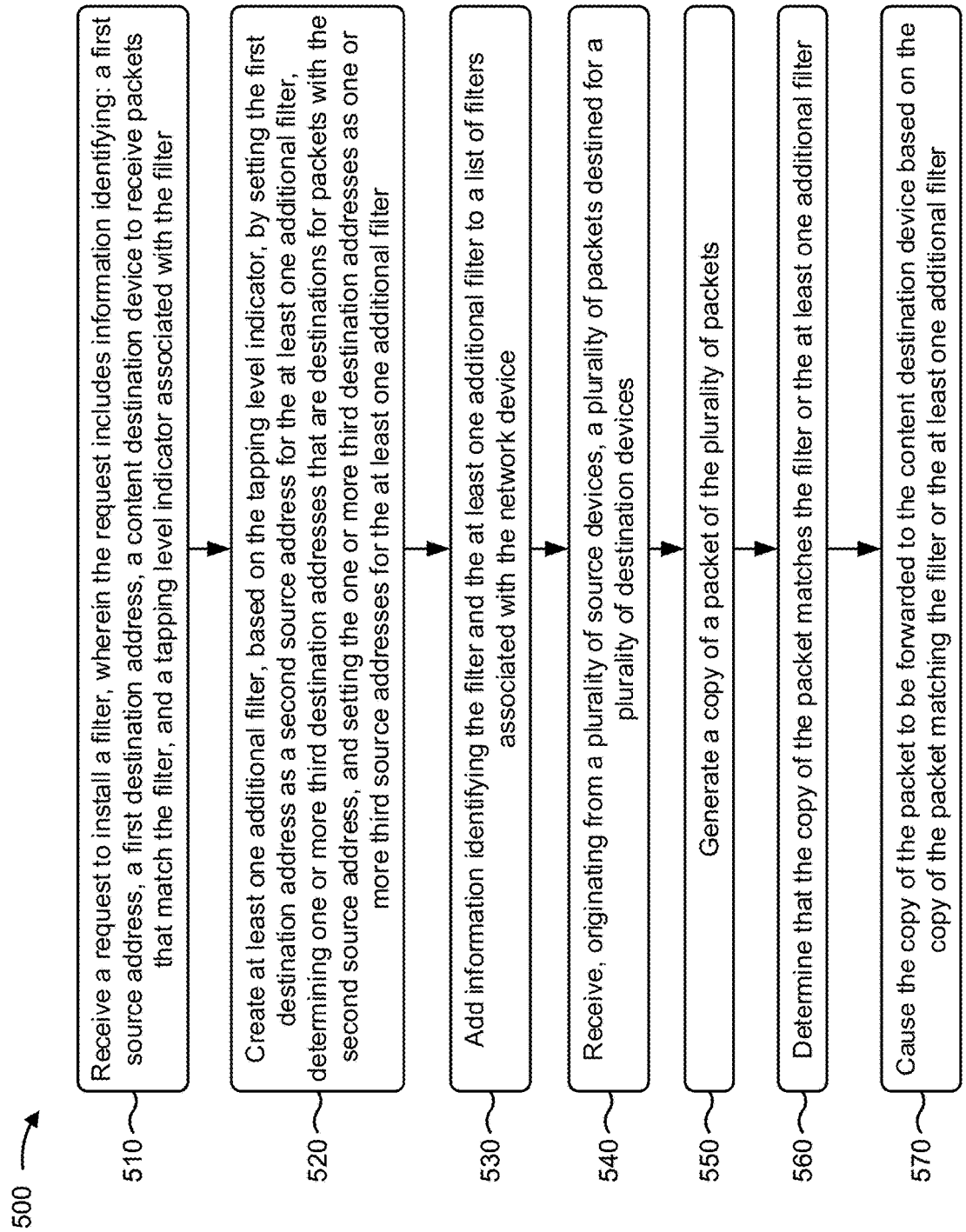

FIG. 5 is a flow chart of an example process 500 for lawfully intercepting traffic and providing the traffic to a content destination based on chained traffic tapping. In some implementations, one or more process blocks of FIG. 5 may be performed by a network device (e.g., network device 220). In some implementations, one or more process blocks of FIG. 5 may be performed by another device or a group of devices separate from or including the network device, such as an endpoint device (e.g., endpoint device 210), a mediation device (e.g., mediation device 240), and/or a content destination device (e.g., content destination device 250).

As shown in FIG. 5, process 500 may include receiving a request to install a filter, wherein the request includes information identifying a first source address, a first destination address, a content destination device to receive packets that match the filter, and a tapping level indicator associated with the filter (block 510). For example, the network device (e.g., using input component 305, switching component 310, controller 320, processor 420, communication interface 470, and/or the like) may receive a request to install a filter, as described above. In some implementations, the request may include information identifying a first source address, a first destination address, a content destination device to receive packets that match the filter, and a tapping level indicator associated with the filter.

As further shown in FIG. 5, process 500 may include creating at least one additional filter, based on the tapping level indicator, by setting the first destination address as a second source address for the at least one additional filter, determining one or more third destination addresses that are destinations for packets with the second source address, and setting the one or more third destination addresses as one or more third source addresses for the at least one additional filter (block 520). For example, the network device (e.g., using switching component 310, controller 320, processor 420, memory 430, and/or the like) may create at least one additional filter, based on the tapping level indicator, by setting the first destination address as a second source address for the at least one additional filter, determining one or more third destination addresses that are destinations for packets with the second source address, and setting the one or more third destination addresses as one or more third source addresses for the at least one additional filter, as described above.

As further shown in FIG. 5, process 500 may include adding information identifying the filter and the at least one additional filter to a list of filters associated with the network device (block 530). For example, the network device (e.g., using controller 320, processor 420, storage component 440, and/or the like) may add information identifying the filter and the at least one additional filter to a list of filters associated with the network device, as described above.

As further shown in FIG. 5, process 500 may include receiving, from a plurality of source devices, a plurality of packets destined for a plurality of destination devices (block 540). For example, the network device (e.g., using input component 305, switching component 310, controller 320, processor 420, communication interface 470, and/or the like) may receive, from a plurality of source devices, a plurality of packets destined for a plurality of destination devices, as described above.

As further shown in FIG. 5, process 500 may include generating a copy of a packet of the plurality of packets (block 550). For example, the network device (e.g., using controller 320, processor 420, memory 430, and/or the like) may generate a copy of a packet of the plurality of packets, as described above.

As further shown in FIG. 5, process 500 may include determining that the copy of the packet matches the filter or the at least one additional filter (block 560). For example, the network device (e.g., using controller 320, processor 420, storage component 440, and/or the like) may determine that the copy of the packet matches the filter or the at least one additional filter, as described above.

As further shown in FIG. 5, process 500 may include causing the copy of the packet to be forwarded to the content destination device based on the copy of the packet matching the filter or the at least one additional filter (block 570). For example, the network device (e.g., using switching component 310, output component 315, controller 320, processor 420, memory 430, storage component 440, communication interface 470, and/or the like) may cause the copy of the packet to be forwarded to the content destination device based on the copy of the packet matching the filter or the at least one additional filter, as described above.

Process 500 may include additional implementations, such as any single implementation or any combination of implementations described below and/or in connection with one or more other processes described elsewhere herein.

In a first implementation, the at least one additional filter may be created based on the request and without receiving any additional request.

In a second implementation, alone or in combination with the first implementation, causing the copy of the packet to be forwarded to the content destination device may include causing the copy of the packet to be forwarded to the content destination device via Internet Protocol (IP)-User Datagram Protocol (UDP) encapsulation.

In a third implementation, alone or in combination with one or more of the first and second implementations, the tapping level indicator associated with the filter may be included in a dedicated field of the request.

In a fourth implementation, alone or in combination with one or more of the first through third implementations, causing the copy of the packet to be forwarded to the content destination device may include causing the copy of the packet to be forwarded to another network device connected to the content destination device via an Internet protocol (IP) security tunnel.

In a fifth implementation, alone or in combination with one or more of the first through fourth implementations, receiving the request to install the filter may include receiving the request to install the filter via a dynamic tasking control protocol (DTCP).

In a sixth implementation, alone or in combination with one or more of the first through fifth implementations, each of the plurality of packets may include signaling information, network management information, or a content of a communication.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
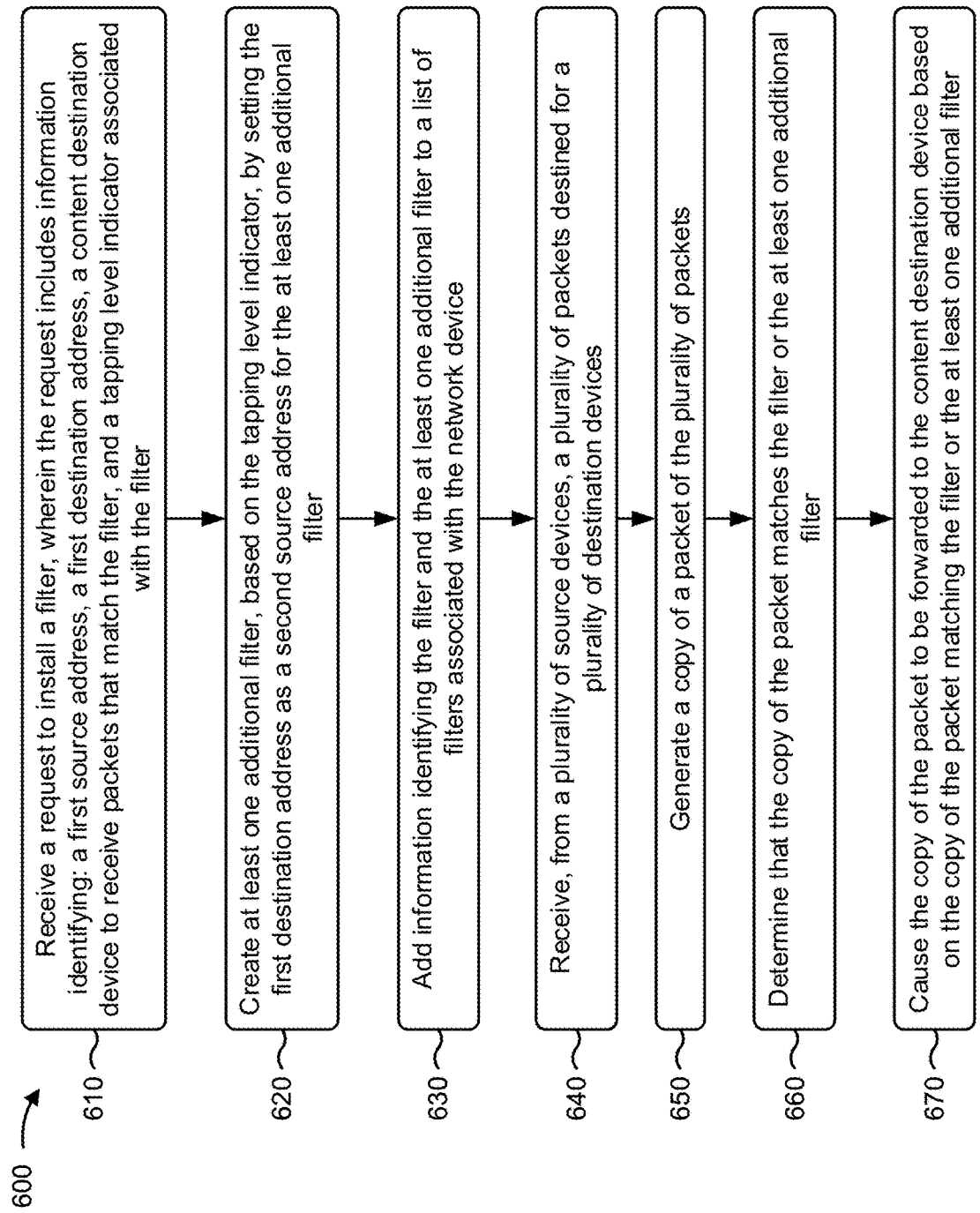

FIG. 6 is a flow chart of an example process 600 for lawfully intercepting traffic and providing the traffic to a content destination based on chained traffic tapping. In some implementations, one or more process blocks of FIG. 6 may be performed by a network device (e.g., network device 220). In some implementations, one or more process blocks of FIG. 6 may be performed by another device or a group of devices separate from or including the network device, such as an endpoint device (e.g., endpoint device 210), a mediation device (e.g., mediation device 240), and/or a content destination device (e.g., content destination device 250).

As shown in FIG. 6, process 600 may include receiving a request to install a filter, wherein the request includes information identifying a first source address, a first destination address, a content destination device to receive packets that match the filter, and a tapping level indicator associated with the filter (block 610). For example, the network device (e.g., using input component 305, switching component 310, controller 320, processor 420, communication interface 470, and/or the like) may receive a request to install a filter, as described above. In some implementations, the request may include information identifying a first source address, a first destination address, a content destination device to receive packets that match the filter, and a tapping level indicator associated with the filter.

As further shown in FIG. 6, process 600 may include creating at least one additional filter, based on the tapping level indicator, by setting the first destination address as a second source address for the at least one additional filter (block 620). For example, the network device (e.g., using switching component 310, controller 320, processor 420, memory 430, and/or the like) may create at least one additional filter, based on the tapping level indicator, by setting the first destination address as a second source address for the at least one additional filter, as described above.

As further shown in FIG. 6, process 600 may include adding information identifying the filter and the at least one additional filter to a list of filters associated with the network device (block 630). For example, the network device (e.g., using switching component 310, controller 320, processor 420, storage component 440, and/or the like) may add information identifying the filter and the at least one additional filter to a list of filters associated with the network device, as described above.

As further shown in FIG. 6, process 600 may include receiving, from a plurality of source devices, a plurality of packets destined for a plurality of destination devices (block 640). For example, the network device (e.g., using input component 305, switching component 310, controller 320, processor 420, communication interface 470, and/or the like) may receive, from a plurality of source devices, a plurality of packets destined for a plurality of destination devices, as described above.

As further shown in FIG. 6, process 600 may include generating a copy of a packet of the plurality of packets (block 650). For example, the network device (e.g., using controller 320, processor 420, memory 430, and/or the like) may generate a copy of a packet of the plurality of packets, as described above.

As further shown in FIG. 6, process 600 may include determining that the copy of the packet matches the filter or the at least one additional filter (block 660). For example, the network device (e.g., using controller 320, processor 420, storage component 440, and/or the like) may determine that the copy of the packet matches the filter or the at least one additional filter, as described above.

As further shown in FIG. 6, process 600 may include causing the copy of the packet to be forwarded to the content destination device based on the copy of the packet matching the filter or the at least one additional filter (block 670). For example, the network device (e.g., using switching component 310, output component 315, controller 320, processor 420, memory 430, storage component 440, communication interface 470, and/or the like) may cause the copy of the packet to be forwarded to the content destination device based on the copy of the packet matching the filter or the at least one additional filter, as described above.

Process 600 may include additional implementations, such as any single implementation or any combination of implementations described below and/or in connection with one or more other processes described elsewhere herein.

In a first implementation, causing the copy of the packet to be forwarded to the content destination device may include causing the copy of the packet to be forwarded to another network device connected to the content destination device via an Internet protocol (IP) security tunnel.

In a second implementation, alone or in combination with the first implementation, the request may include a dynamic tasking control protocol (DTCP) add request.

In a third implementation, alone or in combination with one or more of the first and second implementations, the tapping level indicator associated with the filter may be included in dedicated field of the DTCP add request.

In a fourth implementation, alone or in combination with one or more of the first through third implementations, the copy of the packet may include signaling information, network management information, or a content of a communication.

In a fifth implementation, alone or in combination with one or more of the first through fourth implementations, the at least one additional filter may be created based on the request and no other request.

In a sixth implementation, alone or in combination with one or more of the first through fifth implementations, causing the copy of the packet to be forwarded to the content destination device may include causing the copy of the packet to be forwarded to the content destination device via Internet Protocol (IP)-User Datagram Protocol (UDP) encapsulation.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for lawfully intercepting traffic and providing the traffic to a content destination based on chained traffic tapping. In some implementations, one or more process blocks of FIG. 7 may be performed by a network device (e.g., network device 220). In some implementations, one or more process blocks of FIG. 7 may be performed by another device or a group of devices separate from or including the network device, such as an endpoint device (e.g., endpoint device 210), a mediation device (e.g., mediation device 240), and/or a content destination device (e.g., content destination device 250).

As shown in FIG. 7, process 700 may include receiving a request to install a filter, wherein the request includes information identifying a content destination device to receive packets that match the filter, and a tapping level indicator associated with the filter (block 710). For example, the network device (e.g., using input component 305, switching component 310, controller 320, processor 420, communication interface 470, and/or the like) may receive a request to install a filter, as described above. In some implementations, the request may include information identifying a content destination device to receive packets that match the filter, and a tapping level indicator associated with the filter.

As further shown in FIG. 7, process 700 may include creating at least one additional filter based on the tapping level indicator (block 720). For example, the network device (e.g., using switching component 310, controller 320, processor 420, memory 430, and/or the like) may create at least one additional filter based on the tapping level indicator, as described above.

As further shown in FIG. 7, process 700 may include adding information identifying the filter and the at least one additional filter to a list of filters associated with the network device (block 730). For example, the network device (e.g., using switching component 310, controller 320, processor 420, storage component 440, and/or the like) may add information identifying the filter and the at least one additional filter to a list of filters associated with the network device, as described above.

As further shown in FIG. 7, process 700 may include receiving, from a plurality of source devices, a plurality of packets destined for a plurality of destination devices (block 740). For example, the network device (e.g., using input component 305, switching component 310, controller 320, processor 420, communication interface 470, and/or the like) may receive, from a plurality of source devices, a plurality of packets destined for a plurality of destination devices, as described above.

As further shown in FIG. 7, process 700 may include generating a copy of a packet of the plurality of packets (block 750). For example, the network device (e.g., using controller 320, processor 420, memory 430, and/or the like) may generate a copy of a packet of the plurality of packets, as described above.

As further shown in FIG. 7, process 700 may include determining that the copy of the packet matches the filter or the at least one additional filter (block 760). For example, the network device (e.g., using controller 320, processor 420, storage component 440, and/or the like) may determine that the copy of the packet matches the filter or the at least one additional filter, as described above.

As further shown in FIG. 7, process 700 may include causing the copy of the packet to be forwarded to the content destination device based on the copy of the packet matching the filter or the at least one additional filter (block 770). For example, the network device (e.g., using switching component 310, output component 315, controller 320, processor 420, memory 430, storage component 440, communication interface 470, and/or the like) may cause the copy of the packet to be forwarded to the content destination device based on the copy of the packet matching the filter or the at least one additional filter, as described above.

Process 700 may include additional implementations, such as any single implementation or any combination of implementations described below and/or in connection with one or more other processes described elsewhere herein.

In a first implementation, causing the copy of the packet to be forwarded to the content destination device may cause the content destination device to analyze the copy of the packet.

In a second implementation, alone or in combination with the first implementation, causing the copy of the packet to be forwarded to the content destination device may include causing the copy of the packet to be forwarded to another network device connected to the content destination device via an Internet protocol (IP) security tunnel.

In a third implementation, alone or in combination with one or more of the first and second implementations, the tapping level indicator associated with the filter may be included in a field of the request.

In a fourth implementation, alone or in combination with one or more of the first through third implementations, the at least one additional filter may be created based on the request and without receiving an additional request.

In a fifth implementation, alone or in combination with one or more of the first through fourth implementations, receiving the request to install the filter may include receiving the request to install the filter via a dynamic tasking control protocol (DTCP).

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device, a request to install a filter,
      wherein the request includes information identifying:
         a first source address,
         a first destination address,
         a content destination device to receive packets that match the filter, and
         a tapping level indicator associated with the filter;
   creating, by the network device, at least one additional filter, based on the tapping level indicator, by setting the first destination address as a second source address for the at least one additional filter, determining one or more third destination addresses that are destinations for packets with the second source address, and setting the one or more third destination addresses as one or more third source addresses for the at least one additional filter;
   adding, by the network device, information identifying the filter and the at least one additional filter to a list of filters associated with the network device;
   receiving, by the network device and originating from a plurality of source devices, a plurality of packets destined for a plurality of destination devices;
   generating, by the network device, a copy of a packet of the plurality of packets;
   determining, by the network device, that the copy of the packet matches the filter or the at least one additional filter; and
   causing, by the network device, the copy of the packet to be forwarded to the content destination device based on the copy of the packet matching the filter or the at least one additional filter.

2. The method of claim 1, wherein the at least one additional filter is created based on the request and without receiving any additional request.

3. The method of claim 1, wherein causing the copy of the packet to be forwarded to the content destination device comprises:
   causing the copy of the packet to be forwarded to the content destination device via Internet Protocol (IP)-User Datagram Protocol (UDP) encapsulation.

4. The method of claim 1, wherein the tapping level indicator associated with the filter is included in a dedicated field of the request.

5. The method of claim 1, wherein causing the copy of the packet to be forwarded to the content destination device comprises:
   causing the copy of the packet to be forwarded to another network device connected to the content destination device via an Internet protocol (IP) security tunnel.

6. The method of claim 1, wherein receiving the request to install the filter comprises:
   receiving the request to install the filter via a dynamic tasking control protocol (DTCP).

7. The method of claim 1, wherein each of the plurality of packets includes one or more of:
   signaling information,
   network management information, or
   a content of a communication.

8. A network device, comprising:
   one or more memories; and
   one or more processors to:
      receive a request to install a filter,
         wherein the request includes information identifying:
            a first source address,
            a first destination address,
            a content destination device to receive packets that match the filter, and
            a tapping level indicator associated with the filter;
      create at least one additional filter, based on the tapping level indicator, by setting the first destination address as a second source address for the at least one additional filter, determining one or more third destination addresses that are destinations for packets with the second source address, and setting the one or more third destination addresses as one or more third source addresses for the at least one additional filter;
      add information identifying the filter and the at least one additional filter to a list of filters associated with the network device;
      receive, from a plurality of source devices, a plurality of packets destined for a plurality of destination devices; and
      generate a copy of a packet of the plurality of packets.

9. The network device of claim 8, wherein the one or more processors are further to:
   determine that the copy of the packet matches the filter or the at least one additional filter; and
   cause the copy of the packet to be forwarded to another network device connected to the content destination device via an Internet protocol (IP) security tunnel.

10. The network device of claim 8, wherein the request is a dynamic tasking control protocol (DTCP) add request.

11. The network device of claim 10, wherein the tapping level indicator associated with the filter is included in dedicated field of the DTCP add request.

12. The network device of claim 8, wherein the copy of the packet includes one or more of:
    signaling information,
    network management information, or
    a content of a communication.

13. The network device of claim 8, wherein the at least one additional filter is to be created based on the request and no other request.

14. The network device of claim 8, wherein the one or more processors are further to:
    determine that the copy of the packet matches the filter or the at least one additional filter; and
    cause the copy of the packet to be forwarded to the content destination device via Internet Protocol (IP)-User Datagram Protocol (UDP) encapsulation.

15. A non-transitory computer-readable medium storing instructions, the instructions comprising:
    one or more instructions that, when executed by one or more processors of a network device, cause the one or more processors to:
       receive a request to install a filter,
          wherein the request includes information identifying:

a content destination device to receive packets that match the filter, and
a tapping level indicator associated with the filter;
create at least one additional filter based on the tapping level indicator, by setting a first destination address as a second source address for the at least one additional filter, determining one or more third destination addresses that are destinations for packets with the second source address, and setting the one or more third destination addresses as one or more third source addresses for the at least one additional filter;
add information identifying the filter and the at least one additional filter to a list of filters associated with the network device;
receive, from a plurality of source devices, a plurality of packets destined for a plurality of destination devices; and
generate a copy of a packet of the plurality of packets.

16. The non-transitory computer-readable medium of claim 15, wherein the one or more instructions further cause the one or more processors to:
determine that the copy of the packet matches the filter or the at least one additional filter; and
cause the copy of the packet to be forwarded to the content destination device based on the copy of the packet matching the filter or the at least one additional filter,
wherein causing the copy of the packet to be forwarded to the content destination device is to cause the content destination device to analyze the copy of the packet.

17. The non-transitory computer-readable medium of claim 15, wherein the one or more instructions further cause the one or more processors to:
cause the copy of the packet to be forwarded to another network device connected to the content destination device via an Internet protocol (IP) security tunnel.

18. The non-transitory computer-readable medium of claim 15, wherein the tapping level indicator associated with the filter is included in a field of the request.

19. The non-transitory computer-readable medium of claim 15, wherein the at least one additional filter is to be created based on the request and without receiving an additional request.

20. The non-transitory computer-readable medium of claim 15, wherein the one or more instructions, that cause the one or more processors to receive the request to install the filter, cause the one or more processors to:
receive the request to install the filter via a dynamic tasking control protocol (DTCP).

* * * * *